(12) United States Patent
Geng et al.

(10) Patent No.: US 12,326,906 B2
(45) Date of Patent: Jun. 10, 2025

(54) DATA MANAGEMENT METHOD AND APPARATUS, STORAGE MEDIUM, AND ELECTRONIC DEVICE

(71) Applicant: BEIJING VOLCANO ENGINE TECHNOLOGY CO., LTD., Beijing (CN)

(72) Inventors: Xiaoyu Geng, Beijing (CN); Shimin Yang, Beijing (CN); Jun Guo, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/278,149

(22) PCT Filed: Sep. 6, 2022

(86) PCT No.: PCT/CN2022/117262
§ 371 (c)(1),
(2) Date: Aug. 21, 2023

(87) PCT Pub. No.: WO2023/036128
PCT Pub. Date: Mar. 16, 2023

(65) Prior Publication Data
US 2024/0054163 A1 Feb. 15, 2024

(30) Foreign Application Priority Data
Sep. 10, 2021 (CN) .......................... 202111062534.3

(51) Int. Cl.
*G06F 16/908* (2019.01)
(52) U.S. Cl.
CPC .................................. *G06F 16/908* (2019.01)

(58) Field of Classification Search
CPC .... G06F 16/908; G06F 16/128; G06F 16/245; G06F 16/2365; G06F 16/907; G06F 16/13; G06F 16/182; G06F 16/901
See application file for complete search history.

(56) References Cited

U.S. PATENT DOCUMENTS 10,528,546 B1 * 1/2020 Aron .................... G06F 11/1464
10,983,981 B1 * 4/2021 Sharma ................ G06F 16/2365
(Continued)

FOREIGN PATENT DOCUMENTS

CA 2997071 A1 9/2018

OTHER PUBLICATIONS

International Patent Application No. PCT/CN2022/117262; Int'l Search Report; dated Nov. 28, 2022; 2 pages.

*Primary Examiner* — Ann J Lo
*Assistant Examiner* — Fernando M Mari Valcarcel
(74) *Attorney, Agent, or Firm* — BakerHostetler

(57) ABSTRACT

The present disclosure relates to a data management method and apparatus, a storage medium, and an electronic device. The method comprises: obtaining a data access request sent by an engine side, the data access request being used for requesting to perform an access operation on first target data in a data lake; determining, according to the data access request, target metadata corresponding to the first target data from a metadata storage module, the metadata storage module storing metadata of the data lake in different storage modes, respectively, and the metadata stored in the different storage modes having at least one type of the same information; and sending the first target data corresponding to the target metadata in the data lake to the engine side. By constructing a data lake metadata unified service view that meets various engine requirements, metadata intercommunication between different engines is realized.

20 Claims, 7 Drawing Sheets

(56) References Cited

U.S. PATENT DOCUMENTS

| | | | |
|---|---|---|---|
| 2017/0177486 A1* | 6/2017 | Horn | G06F 3/0656 |
| 2018/0253477 A1 | 9/2018 | Schoueri et al. | |
| 2018/0373781 A1 | 12/2018 | Palrecha | |
| 2019/0129894 A1* | 5/2019 | Peng | G06F 12/08 |
| 2020/0327124 A1* | 10/2020 | Rosen | G06F 9/5077 |
| 2020/0341961 A1* | 10/2020 | Gong | G06F 16/2246 |
| 2020/0349142 A1* | 11/2020 | Padmanabhan | H04L 9/0637 |
| 2020/0349163 A1* | 11/2020 | Nadeau | G06F 16/273 |

* cited by examiner

DATA MANAGEMENT METHOD AND APPARATUS, STORAGE MEDIUM, AND ELECTRONIC DEVICE

CROSS REFERENCE

The present application is the U.S. National Stage of International Application No. PCT/CN2022/117262, titled "DATA MANAGEMENT METHOD AND APPARATUS, STORAGE MEDIUM, AND ELECTRONIC DEVICE", filed on Sep. 6, 2022, which claims the priority of the Chinese patent application No. 202111062534.3, filed on Sep. 10, 2021 and entitled "DATA MANAGEMENT METHOD AND APPARATUS, STORAGE MEDIUM, AND ELECTRONIC DEVICE", the entire contents of both of which are incorporated herein by reference.

TECHNICAL FIELD

The present disclosure relates to the technical field of databases, in particular, to a data management method and apparatus, a storage medium and an electronic device.

BACKGROUND

A data lake refers to a system that stores data using a large binary object or file format, is used to uniformly store data, and includes both original copies in the original system and the converted data, such as reports, visual data and so on.

In the big data scenario, due to the different business scenarios and data scales, there are various big data engines to deal with the needs of a certain field. For example, the computing engines include Spark (a computing engine) for data analysis, Presto (a data query engine) for interactive analysis, Flink (an open source streaming framework) for stream processing, and the like, and the storage engines include a Hadoop Distributed File System (HDFS), an Object Storage Service (OSS), etc. If these systems are integrated on the same data, a lot of ETL (Extract-Transform-Load) work is faced for data processing, storage format conversion and so on, which will lead to increased cost and time.

SUMMARY

The invention content section is provided to present the ideas in brief form, which will be described in detail in the specific embodiments section below. The content of the invention is not intended to identify the essential or necessary features of the technical solution for which protection is claimed, nor is it intended to be used to limit the scope of the technical solution for which protection is sought.

According to a first aspect of embodiments of the present disclosure, the present disclosure provides a data management method, including:

Acquiring a data access request sent by an engine side, wherein the data access request is for requesting an access operation on first target data in a data lake;

Determining target metadata corresponding to the first target data from a metadata storage module according to the data access request, wherein the metadata storage module stores metadata of the data lake using different storage modes, respectively, and the metadata stored using the different storage modes have at least one kind of same information among the metadata; and Sending first target data in the data lake corresponding to the target metadata to the engine side.

According to a second aspect of embodiments of the present disclosure, the present disclosure provides a data management apparatus, including:

An acquisition module configured to acquire a data access request sent by an engine side, wherein the data access request is for requesting an access operation on first target data in a data lake;

A determination module, configured to determine target metadata corresponding to the first target data from a metadata storage module according to the data access request, wherein the metadata storage module stores metadata of the data lake using different storage modes, respectively, and the metadata stored using the different storage modes have at least one kind of same information among the metadata; and A sending module configured to send first target data in the data lake corresponding to the target metadata to the engine side.

According to a third aspect of embodiments of the present disclosure, the present disclosure provides a computer-readable medium having stored thereon a computer program which, when executed by a processing apparatus, implements the steps of the method of the first aspect of the present disclosure.

According to a fourth aspect of embodiments of the present disclosure, the present disclosure provides an electronic device, including:

a storage apparatus having a computer program stored thereon;

a processing apparatus, configured to execute the computer program in the storage apparatus to implement the steps of the method of the first aspect of the present disclosure.

With the above technical solutions, the metadata storage module is used to store metadata of the data lake based on different storage modes respectively, wherein the metadata stored using the different storage modes has at least one kind of same information among the metadata, and a unified metadata service view of different engines is implemented. When acquiring the first target data in the data lake, each of the different engines may acquire the target metadata corresponding to the first target data through the metadata storage module, thereby returning the first target data corresponding to the target metadata to the engine side. By building a data lake metadata unified service view that meets the demands of various engines, metadata interworking among different engines is achieved, thereby achieving the objective of data sharing and avoiding the generation of additional data processing costs.

Other features and advantages of the present disclosure will be described in detail in the Detailed Description section that follows.

BRIEF DESCRIPTION OF THE DRAWINGS

Combined with the accompanying drawings and referring to the following specific embodiments, the above and other features, advantages and aspects of each embodiment of the present disclosure will become more obvious. Throughout the drawings, identical or similar drawing markings indicate identical or similar elements. It should be understood that the drawings are schematic and that the originals and elements are not necessarily drawn to scale. In the drawings.

DETAILED DESCRIPTION OF PREFERRED EMBODIMENTS

Figure 1:
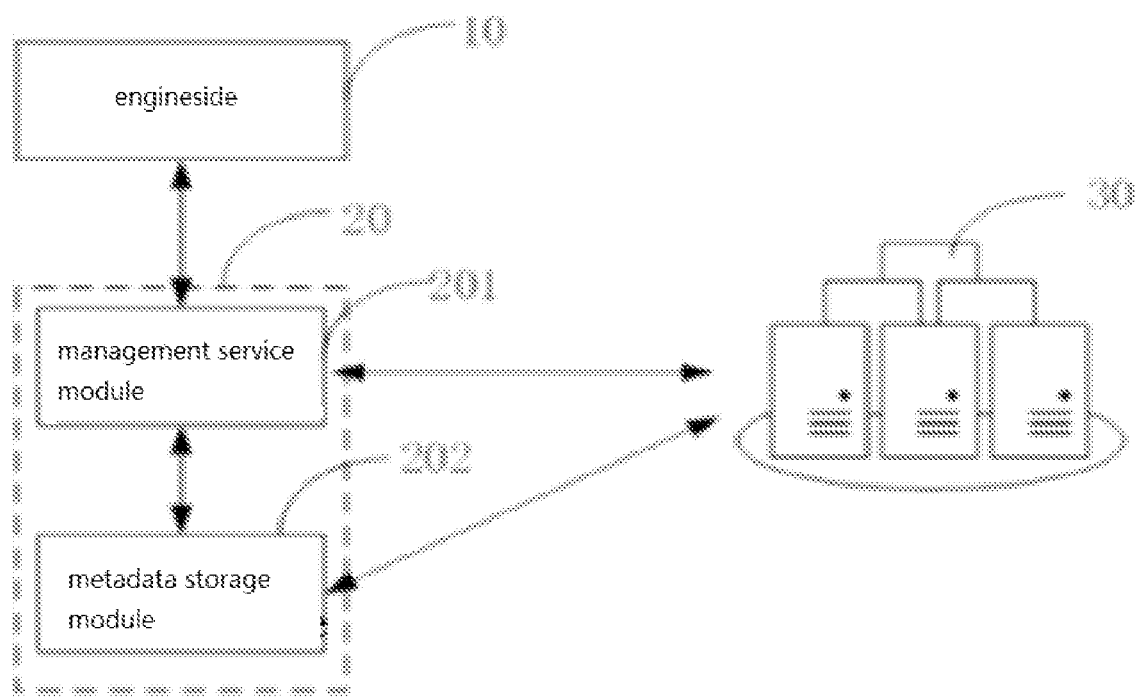
FIG. 1 is a schematic diagram of an application scenario of a data management method according to an exemplary embodiment.

Embodiments of the present disclosure will be described in more detail below with reference to the accompanying drawings. Although certain embodiments of the present disclosure are shown in the drawings, it should be understood that the present disclosure may be achieved in various forms and should not be interpreted as being limited to the embodiments described herein, but rather provided for a more thorough and complete understanding of the present disclosure. It should be understood that the drawings and embodiments of the present disclosure are for exemplary purposes only and are not intended to limit the scope of protection of the present disclosure.

It should be understood that the steps described in the embodiments of the methods described in the present disclosure may be performed in different sequences, and/or in parallel. Further, method embodiments may include additional steps and/or omit the steps shown. The scope of this disclosure is not limited in this respect.

The term "including" and its variations herein as used herein are open-ended including, i.e. "including but not limited to". The term "based on" is "at least partially based on". The term "one embodiment" means "at least one embodiment"; the term "another embodiment" means "at least one additional embodiment"; The term "some embodiments" means "at least some embodiments". The definitions of other terms are given in the description below.

It should be noted that the concepts of "first", "second" and so on referred to in the present disclosure are only used to distinguish different devices, modules or units, and are not used to limit the order or interdependence of the functions performed by these devices, modules or units.

It should be noted that references to "one", "multiple" modifications in the present disclosure are indicative rather than restrictive, and those skilled in the art should understand that unless otherwise expressly indicated in the context, should be understood as "one or more".

The names of messages or information exchanged between multiple devices in the present public embodiment are for illustrative purposes only, and are not used to limit the scope of these messages or information.

FIG. 1 is a schematic diagram of an application scenario of a data management method according to an exemplary embodiment. As shown in FIG. 1, the data management method can be applied to a metadata management system 20 including a management service module 201 and a metadata storage module 202. The metadata management system 20 is in communication connection with an engine side 10, wherein the metadata management system 20 can be designed with a unified interface through which the engine side 10 accesses the metadata management system 20. The metadata management system 20 is in communication connection with a data lake 30, which may be a storage system, e.g. a HDFS storage system, for storing massive amounts of data in different formats. The management service module 201 is in communication connection with the metadata storage module 202, the management service module 201 is in communication connection with the data lake 30, and the metadata storage module 202 is in communication connection with the data lake 30.

It will be appreciated that the metadata storage module 202 is configured to persistently store the metadata of the data lake 30 and the management service module 201 is configured to support read and write access to the data lake 30 by the engine side 10.

It is worth noting that the management service module 201 and the metadata storage module 202 may be independently provided servers.

Figure 2:
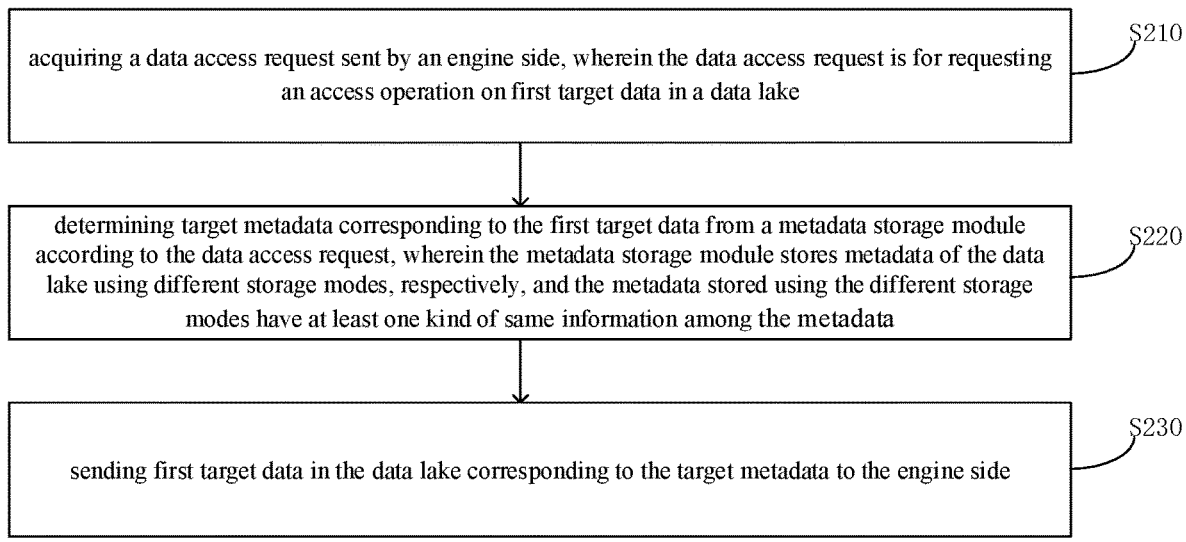
FIG. 2 is a flowchart of a data management method according to an exemplary embodiment.

FIG. 2 is a flowchart of a data management method according to an exemplary embodiment. As shown in FIG. 2, the data management method may be applied to a management service module in a metadata management system, and the data management method may include the following steps.

In step S210, a data access request sent by an engine side is acquired, wherein the data access request is for requesting an access operation to first target data in a data lake.

Here, the management service module receives a data access request sent by the engine side for requesting an access operation to first target data in the data lake. A data lake architecture is a multi-data-source oriented information store for storing massive amounts of data in different formats, such as structured data, semi-structured data and unstructured data.

It is worth noting that the engine side may be a different engine, for example, it may be a calculation engine Spark, a Presto engine, and so on.

In step S220, target metadata corresponding to the first target data is determined from a metadata storage module according to the data access request, wherein the metadata storage module stores metadata of the data lake using different storage modes, respectively, and the metadata stored using the different storage modes have at least one kind of same information among the metadata.

Here, the management service module acquires target metadata corresponding to the first target data from the metadata storage module in response to the data access request. The metadata storage module stores the metadata of the data lake using different storage modes, respectively, and the metadata stored using different storage modes have at least one kind of same information among the metadata. It is worth noting that different storage modes store the metadata of the data lake, and different metadata in the data lake may be stored using one or more storage modes, and the storage modes may or may not be the same for different storage systems. When different metadata of the data lake are stored using different storage modes, respectively, the metadata stored using different storage modes have at least one kind of same information among the metadata, so that the different metadata of the same data are related by the same information.

In some embodiments, the metadata storage module includes different storage systems, e.g., a HDFS storage system, a KV storage system, etc. For each storage system, the metadata of the data lake is stored in the storage mode of the corresponding storage system. It should be understood that the storage mode used may be different for different storage systems, but the metadata stored using different storage modes have at least one kind of same information among the metadata. For example, the HDFS storage system stores metadata A of the target data in a storage mode A, and the KV storage system stores metadata B of the target data in a storage mode B, and at least one kind of same information exists between the metadata stored in the storage mode A and the storage mode B, such as a unique identifier of the corresponding target data.

Thus, the metadata storage module includes different storage systems, allowing the metadata of the data lake to be stored decentralized.

In step S230, first target data in the data lake corresponding to the target metadata is sent to the engine side.

Here, after the target metadata is acquired, the first target data corresponding to the target metadata is acquired from the data lake according to the target metadata, and the first target data is sent to the engine side.

It is worth noting that, in some examples, the management service module may send the target metadata to the engine side, which acquires the first target data corresponding to target metadata from the data lake according to the target metadata. In other examples, the management service module may acquire the first target data corresponding to the target metadata from the data lake through the target metadata, and send the first target data to the engine side.

Thereby, the metadata storage module is configured to separately store the metadata of the data lake based on different storage modes, wherein the metadata stored using the different storage modes have at least one kind of same information among the metadata, thus enabling a unified metadata service view of different engines. When acquiring the first target data in the data lake, each of the different engines may acquire the target metadata corresponding to the first target data through the metadata storage module, thereby returning the first target data corresponding to the target metadata to the engine side. By building the data lake metadata unified service view that meets the demands of various engines, metadata interworking between different engines is achieved, thereby achieving the objective of data sharing and avoiding the generation of additional data processing costs.

In some embodiments, the metadata storage module stores the metadata of the data lake including Instant, Table Metadata, Commit Metadata, and Version Metadata, respectively, in different storage modes.

The Table Metadata records index information of data in the data tables of the data lake, including, for example, all partition information of the data tables, and all file information under each partition, such as a file name, a file path, file index information, etc. For the data tables of the data lake, the management service module may maintain a globally unique identifier tbl_id for each data table, and the metadata information of the file may then be stored in the metadata storage module by means of a storage mode of tbl_id, partition, version and filename. Through the storage mode described above, both individual partitions of the data table and all file information under each partition can be acquired, and snapshot management can be achieved.

The Instant Metadata is metadata that is created upon receiving a request for the engine side to write data to the data lake to record the data writing state. The Instant Metadata is metadata of Instants on the Timeline, each Instant recording a write commitment to the data lake, which is recorded regardless of whether the write commitment is successful or not. Each Instant Metadata represents an operation on a data table at a certain time point so as to reach a certain state, and includes a timestamp, an action, and a state, the state includes request (representing a request state), Inflight (representing a state of an operation being performed), and Commit (representing the state of an operation being completed). Thus, for the Instant Metadata, a storage mode of tbl_id, timestamp, action, and state may be employed for storage in the metadata storage module.

The Commit Metadata is metadata corresponding to the current written data that is committed after the engine side successfully writes data to the data lake at one time. The Commit Metadata is actually the metadata information of successfully writing committed data to the data lake at one time, including the updated files involved in this writing, added files and the number of pieces of added data written this time. For the Commit Metadata, it may be flat split into KV pairs, and stored in a KV storage system of the metadata storage module in a storage mode of tbl_id and KV pairs.

The Version Metadata characterizes the version information of the data tables written to the data lake, the version information records all successfully completed write operations. The Version Metadata is stored in the metadata storage module by a storage mode of tbl_id and incremented version number. The Version Metadata is configured to perform version control and to provide Compare and Set (CAS) capability for data lake concurrent write scenarios. The timeline builds the successfully completed Instant in a version order, and the file information under each partition in the Table Metadata maintains corresponding snapshots according to the version so as to synchronously update and clean the snapshots.

It is worth noting that in the above embodiments, the storage modes of the Instant Metadata, the Table Metadata, the Commit Metadata and the Version Metadata are different, but they have at least one identifier "tbl_id" in common, which is used to build associations between the Instant Metadata, the Table Metadata, the Commit Metadata and the Version Metadata. It should be understood that, in practical application scenarios, the same information between metadata stored in different storage modes can also be made by other information.

In some embodiments, the management service module may include a data splitting unit configured to split the newly added Instant Metadata, Table Metadata, Commit Metadata and Version Metadata according to the corresponding storage modes, respectively, and store the split metadata in the metadata storage module according to the corresponding storage modes.

In some embodiments, the Table Metadata includes data partition information and index information for each data under each partition. Step S230 may split the data in the target partition according to the index information of each data under the target partition included in the target metadata, acquire the first target data, and send the first target data to the engine side.

Here, the management service module may include a snapshot management unit configured to provide the capability of file splitting. The snapshot management unit may split the data in the target partition based on the file size and predicate push-down splitting and filtering, so as to reduce the size of the file returned to the engine side and accelerate the query speed of the engine side.

In some embodiments, the data management method may further include:

preset types of data stored in the metadata storage module is cached locally to enable the engine side to access data in the data lake based on the preset types of data cached locally.

Here, a cache unit may be provided in the management service module, the management service module caches preset types of data stored in the metadata storage module into the cache unit, so as to enable the engine side to access the preset types of data in the cache unit, thus improving the speed of the engine accessing the data.

Optionally, for the first type of data, the first type of data stored in the metadata storage module is cached locally, wherein the first type of data is data having an access frequency of the engine side reaching a first preset frequency and a data size reaching a first data amount.

Here, the first type of data refers to the metadata which is frequently accessed by the engine side and has a small amount of data, for example, the Table Metadata. For the first type of data, the management service module maintains it in the cache unit at all times to increase the speed of access on the engine side.

Optionally, for the second type of data, the second type of data stored in the metadata storage module is cached locally based on a least recently used algorithm, wherein the second type of data is data having an access frequency of the engine side reaching a second preset frequency and a data size reaching a second data amount, the second preset frequency is smaller than the first preset frequency, the second data amount is larger than the first data amount.

Here, the second type of data refers to the metadata with low access frequency on the engine side and large amount of data, for example, the Commit Metadata, index metadata, and the like. For the second type of data, it can be stored in a fixed memory space, updated and eliminated by the Least Recently Used (LRU) algorithm to increase the speed of access on the engine side.

Figure 3:
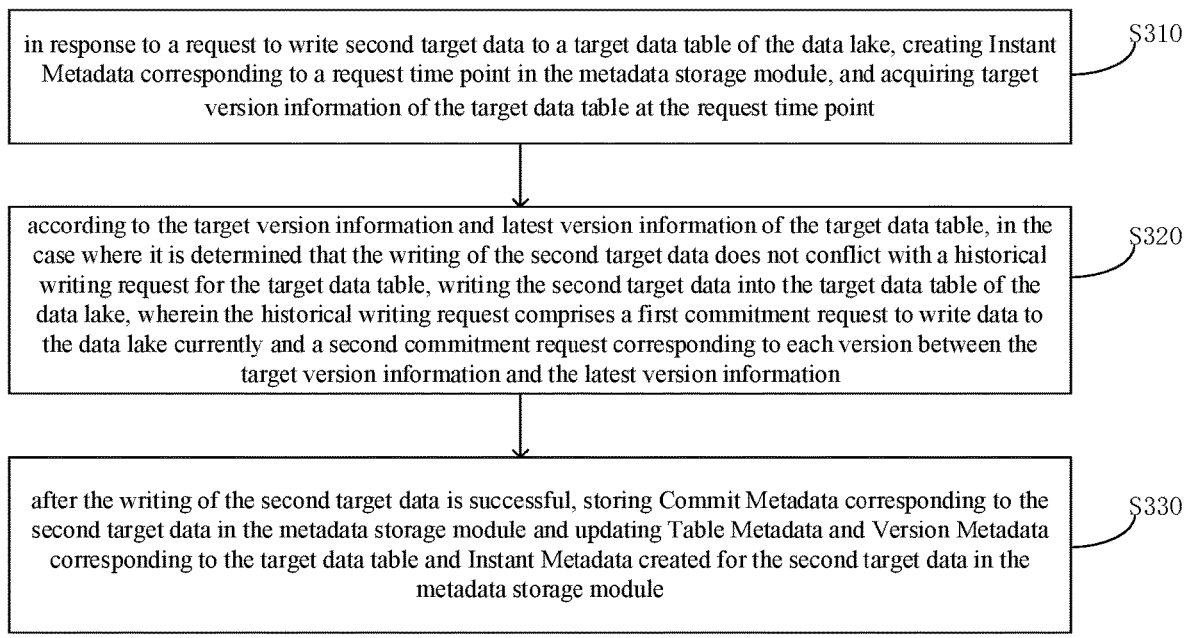
FIG. 3 is a flowchart of a data management method according to another exemplary embodiment.

FIG. 3 is a flowchart of a data management method according to another exemplary embodiment. As shown in FIG. 3, in some embodiments, the data management method may further include the following steps.

In step S310, in response to a request to write second target data to a target data table of the data lake, the Instant Metadata corresponding to a request time point is created in the metadata storage module, and target version information of the target data table at the request time point is acquired.

Here, when the engine needs to write the second target data into the target data table of the data lake, a writing request is sent to the management service module, and in response to the writing request, the management service module creates the Instant Metadata corresponding to the request time point in the metadata storage module, and acquires target version information of the target data table when the management service module creates the Instant Metadata at the request time point. For example, the management service module creates the Instant Metadata at the request time point of 3021/02/07, 10:00, then the target version information is the version information of the target data table at 3021/02/07, 10:00. The second target data is data to be written in the data lake.

The Instant Metadata corresponding to the request time point is created in the metadata storage module by creating "Instant HI WRITE" on the timeline, at which time the state of Instant HI WRITE is "request" indicating that writing of the second target data to the target data table is requested.

In step S320, according to the target version information and latest version information of the target data table, in the case where it is determined that the writing of the second target data does not conflict with a historical writing request for the target data table, the second target data is written into the target data table of the data lake, wherein the historical writing request includes a first commitment request to write data to the data lake currently and a second commitment request corresponding to each version between the target version information and the latest version information.

Here, the historical writing request includes a first commitment request to write data to the data lake currently and a completed second commitment request corresponding to each version between the target version information and the latest version information. According to the target version information and the latest version information of the target data table, whether the writing of the second target data conflicts with the first commitment request and the second commitment request for the target data table is determined, and the second target data is written into the target data table of the data lake in the case where it is determined that the writing of the second target data does not conflict with the first commitment request and the second commitment request for the target data table. It should be understood that the writing of the second target data does not conflict with both the first commitment request and the second commitment request for the target data table, meaning that a request to write the second target data to the target data table does not update the data being written by the first commitment request and the second commitment request. The writing of the second target data conflicts with the first commitment request and/or the second commitment request for the target data table, meaning that a request to write the second target data to the target data table updates the data being written by the first commitment request and/or the second commitment request.

The latest version information of the target data table refers to real-time version information of the target data table. The first commitment request may be Instant with a state of "Inflight" on the timeline, and the second commitment request may be a request to complete writing of data to the data lake for all versions between the target version information and the latest version information, and Instant with a state of "Commit" on the timeline.

In some examples, the request to write the second target data to the target data table is forgone if the writing of the second target data conflicts with at least one of the first commitment request and the second commitment request for the target data table. Writing of the second target data conflicts with at least one of the first commitment request and the second commitment request for the target data table, indicating that a request to write the second target data to the target data table affects the data file of a previously committed writing request.

It is worth noting that the conflict checking between the request to write the second target data to the target data table and the historical writing request may be based on a Compare and Set (CAS) mechanism. The CAS mechanism assumes that data will not cause conflict in general, and when data is submitted and updated, it will formally detect whether data conflicts or not. Of course, in the actual application process, different conflict checking mechanisms can also be selected based on different scenarios of concurrent write requirements, such as using a pessimistic lock mechanism for conflict checking.

In step S330, after the writing of the second target data is successful, the Commit Metadata corresponding to the second target data is stored in the metadata storage module and the Table Metadata and the Version Metadata corresponding to the target data table and the Instant Metadata created for the second target data in the metadata storage module is updated.

Here, after successfully writing the second target data to the target data table of the data lake, the management service module stores the Commit Metadata corresponding to the second target data in the metadata storage module, and updates the Table Metadata and the Version Metadata corresponding to the target data table and the Instant Metadata created for the second target data in the metadata storage module.

The states corresponding to the Instant Metadata created for the second target data include "request", "Inflight" and "Commit". During writing of each data, the state of the Instant Metadata is updated synchronously. For example, upon successful writing of the second target data, the state of the Instant Metadata is changed from "Inflight" to "Commit".

It is worth noting that the flag that the management service module finishes writing the second target data is that the management service module successfully applies for atom creation V_READ+1, wherein, V_READ is the target version information. If the application for atom creation V_READ+1 fails, the writing of the second target data fails.

Therefore, the metadata storage module separately stores the metadata of the data lake in different storage modes, which provides the CAS capability for the concurrent write control of the management service module. By checking the conflict between the request to write the second target data to the target data table and the historical write request, the concurrent write control can be realized. It should be understood that the rules of conflict checking can be customized according to the data application scenario of the user, including partition-level conflict checking, column-level conflict checking, file-level and so on.

Figure 4:
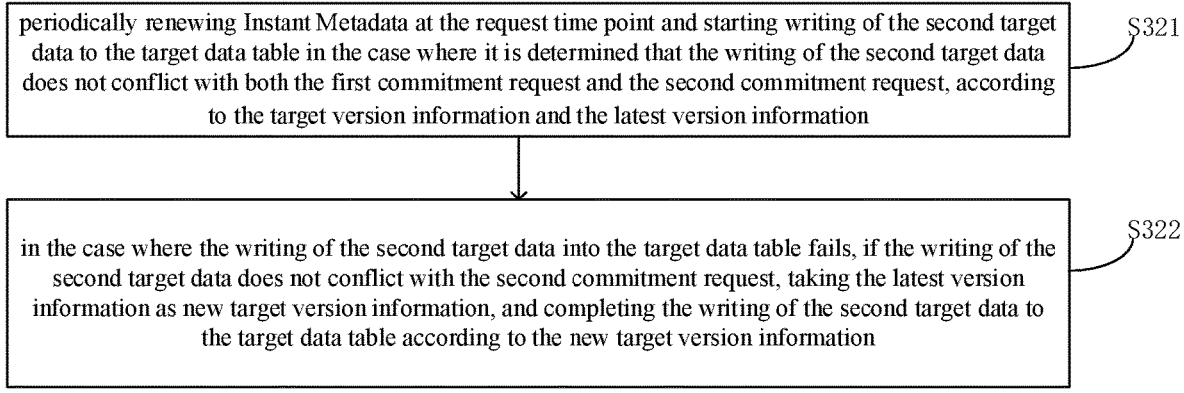
FIG. 4 is a flowchart of a collision checking method according to an exemplary embodiment.

FIG. 4 is a flowchart of a collision checking method according to an exemplary embodiment. As shown in FIG. 4, in some implementations that may be implemented, the step S320 that according to the target version information and the latest version information of the target data table, in the case where it is determined that the writing of the second target data does not conflict with the historical writing request for the target data table, the second target data is written into the target data table of the data lake may include the following steps.

In step S321, the Instant Metadata at the request time point is periodically renewed and writing of the second target data to the target data table is started in the case where it is determined that the writing of the second target data does not conflict with both the first commitment request and the second commitment request, according to the target version information and the latest version information.

Here, the management service module acquires the latest version information of the target data table from the metadata storage module, then determines from the target version information and the latest version information whether the writing of the second target data does not conflict with both the first commitment request and the second commitment request, in the absence of any conflict, the management service module periodically renews the Instant Metadata at the request time point to prevent the Instant Metadata at the request time point from failing during the data writing to cause a data writing failure, and starts writing the second target data to the target data table. At this point, the state of the Instant Metadata at the request time point is changed from "request" to "Inflight".

In some embodiments, the management service module detects whether the target version information is consistent with the latest version information of the target data table, when the target version information is consistent with the latest version information, whether the request to write the second target data to the target data table conflicts with the first commitment request is detected, and if not, it is determined that the writing of the second target data does not conflict with both the first commitment request and the second commitment request.

Optionally, in the case that the request to write the second target data to the target data table conflicts with the first commitment request, whether a lease of the first commitment request that conflicts with a request to write second target data to the target data table expires is detected, and if the lease expires, it is determined that the writing of the second target data does not conflict with the first commitment request and the second commitment request.

It should be appreciated that if the lease of the first commitment request conflicting with the request to write the second target data to the target data table expires, it is indicated that the first commitment request has terminated, and the request to write the second target data to the target data table does not conflict with the first commitment request. If the lease of the first commitment request conflicting with the request to write the second target data to the target data table is not expired, it is indicated that the first commitment request is not terminated, the request to write the second target data to the target data table may be abandoned, or the request to write the second target data to the target data table may be. re-executed.

In some embodiments, in the case where the target version information is not consistent with the latest version information, if the writing of the second target data does not conflict with the second commitment request, the latest version information is taken as new target version information, and whether the new target version information is consistent with the latest version information of the target data table is re-determined according to the new target version information.

Here, when the target version information is not consistent with the latest version information, and the request to write the second target data to the target data table does not conflict with the second commitment request, the latest version information of the target data table is taken as the new target version information, and based on the new target version information, whether the new target version information is consistent with the latest version information of the target data table is re-determined, and if so, whether the request to write the second target data to the target data table conflicts with the first commitment request is further determined.

In step S322, in the case where the writing of the second target data into the target data table fails, if the writing of the second target data does not conflict with the second commitment request, the latest version information is taken as new target version information, and the writing of the second target data to the target data table is completed according to the new target version information.

Here, if the state of the Instant Metadata at the request time point fails to transit from "Inflight" to "Commit", it is indicated that the writing of the second target data to the target data table fails, in this case, it is checked whether the writing of the second target data conflicts with the second commitment request, and if so, the target version information is updated to the latest version information of the target data table, the new target version information is acquired, and the writing of the second target data to the target data table is completed according to the new target version information. When the second target data is successfully written to the target data table according to the new target version information, the state of the Instant Metadata at the request time point is converted from "Inflight" to "Commit".

It is worth noting that, in the case wherein the writing of the second target data into the target data table is successful, the state of the Instant Metadata at the request time point is converted from "Inflight" to "Commit", it is indicated that the writing of the second target data into the target data table is completed. The Commit Metadata corresponding to the second target data is stored in the metadata storage module, and the Table Metadata and the Version Metadata corresponding to the target data table and the Instant Metadata created for the second target data in the metadata storage module is updated.

In some embodiments, if the request to write the second target data to the target data table conflicts with the second commitment request, the request to write the second target data to the target data table may be abandoned or re-executed.

Hereinafter, the above embodiment will be described in detail with reference to FIG. 5.

Figure 5:
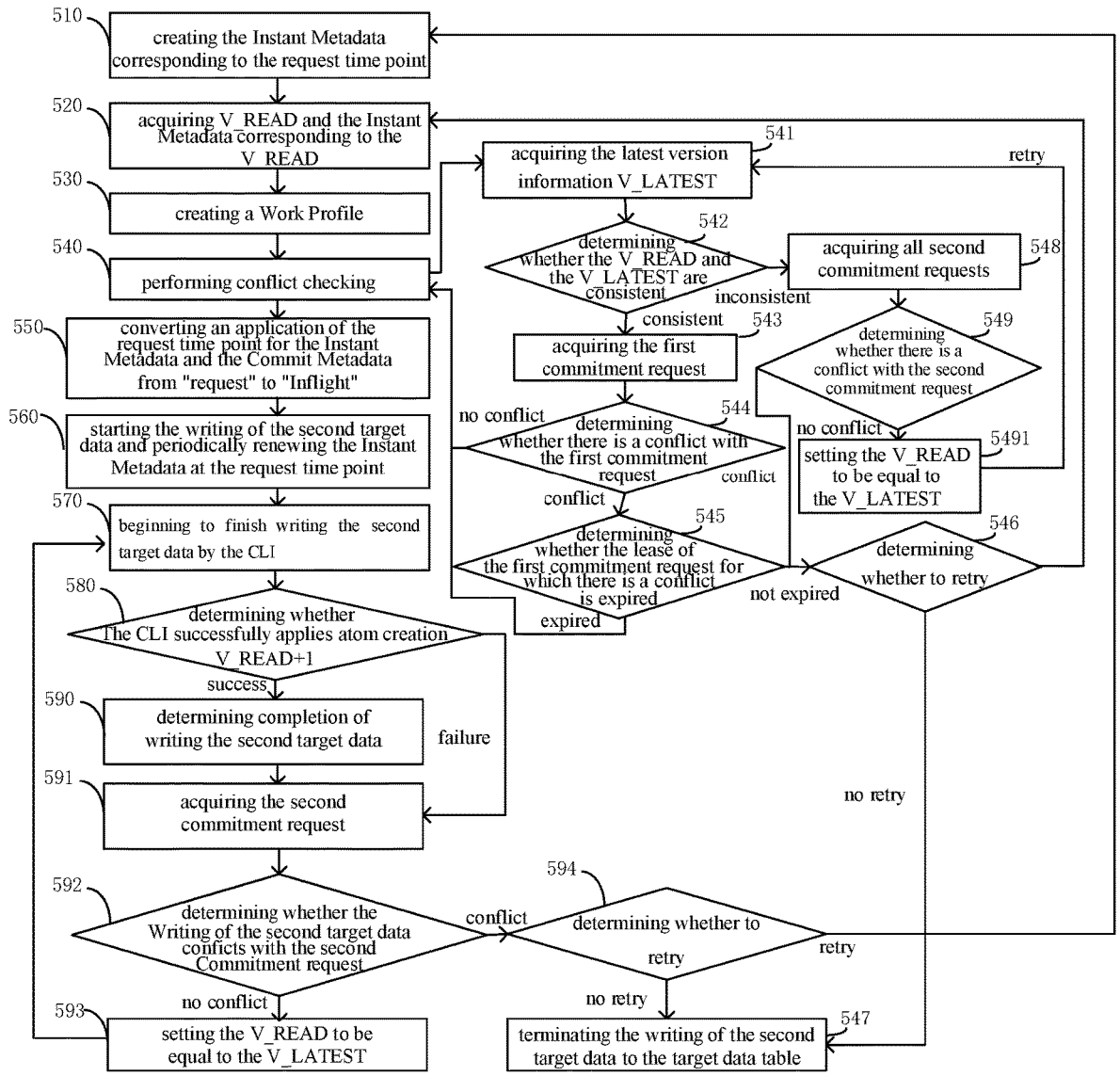
FIG. 5 is a flowchart of a collision checking method according to another exemplary embodiment.

FIG. 5 is a flowchart of a collision checking method according to another exemplary embodiment. As shown in FIG. 5, the data management method may include the following steps.

Step 510, the Instant Metadata corresponding to the request time point is created.

Here, a CLI (Command Line Interface) acquires the request that the engine writes the second target data into the target data table of the data lake, and in response to the request, applies to the management service module for new creation of Instant Metadata (Instant HI WRITE) corresponding to the request time point, the state of the Instant Metadata being "request".

Step 520, V_READ and the Instant Metadata corresponding to the V_READ are acquired.

Here, the CLI acquires the target version information V_READ of the target data table and Instant HI READ to which the target version information V_READ corresponds. Each piece of version information points to an Instant Metadata, The Instant HI READ is the Instant Metadata pointed to by the target version information V_READ.

Step 530, a Work Profile is created.

Here, the CLI creates the Work Profile according to the Instant HI READ.

Step 540, conflict checking is performed.

The step 540 may include the following steps:

Step 541, the latest version information V_LATEST is acquired.

Step 542, whether the V_READ and the V_LATEST are consistent is determined.

Step 543, when the V_READ is consistent with the V_LATEST, the first commitment request is acquired.

Step 544, whether there is a conflict with the first commitment request is determined.

Here, the CLI judges whether the request to write the second target data conflicts with the first commitment request, and the specific method for conflict judgment has been explained in detail in the above embodiments, and will not be repeated here.

Step 545, when the request to write the second target data conflicts with the first commitment request, whether the lease of the first commitment request that conflicts with the request to write the second target data expires is further determined.

Here, when the request to write the second target data does not conflict with the first commitment request, the conflict checking is completed, step 550 is performed.

Step 546, when the lease of the first commitment request for which there is a conflict is not expired, whether to retry is determined.

Here, when the lease of the first commitment request for which there is a conflict expires, the conflict checking is completed, and step 550 is performed.

Step 547, when a retry is not required, the writing of the second target data to the target data table is terminated.

Here, when a retry is required, step 520 is returned for execution. It should be understood that whether to retry or not may be selected according to a user operation. The writing of the second target data to the target data table is terminated, the state of the Instant Metadata at the request time point is converted from "Inflight" to "Invalid".

Step 548, when V_READ does not coincide with V_LATEST, all second commitment requests are acquired.

Step 549, whether there is a conflict with the second commitment request is determined.

Here, the CLI judges whether the request to write the second target data conflicts with the second commitment request, and the specific method for the conflict judgment has been explained in detail in the above embodiments, and will not be repeated here.

Step S491, when the request to write the second target data does not conflict with the second commitment request, the V_READ is set to be equal to the V_LATEST, and step 541 is returned for execution.

When the request to write the second target data conflicts with the second commitment request, step 547 is performed.

Step 550, an application of the request time point for the Instant Metadata and the Commit Metadata is converted from "request" to "Inflight".

Here, an application of the CLI to the management service module for the Instant Metadata and the Commit Metadata is converted from "request" to "Inflight".

Step 560, the writing of the second target data is started and the Instant Metadata at the request time point is periodically renewed.

Here, the CLI starts writing the second target data to the target data table and periodically renews the Instant Metadata at the request time point, and the CLI can renew the Instant Metadata at the request time point by periodically sending a heartbeat to the management service module.

Step 570, the CLI begins to finish writing the second target data.

Step 580, whether the CLI successfully applies atom creation V_READ+1 is determined.

Here, the CLI completes writing the second target data to the target data table, applies for committing the Commit Metadata, and applies for atomic creation to the metadata management system, so that the version information of the target data table is changed to V_READ+1, which points to Instant HI WRITE.

Step 590, completion of writing the second target data is determined when the atom creation is successful.

Here, writing of the second target data is completed, and the application of the Instant Metadata and the Commit Metadata at the request time point is converted from "Inflight" to "Commit".

Step 591, when atom creation fails, the second commitment request is acquired.

Step 592, it is determined whether the writing of the second target data conflicts with the second commitment request.

Step 593, when the writing of the second target data does not conflict with the second commitment request, the V_READ is set to be equal to the V_LATEST, and step 570 is returned for execution.

Step 594, when the writing of the second target data does not conflict with the second commitment request, it is determined whether the writing of the second target data needs to be retried.

Here, when the writing of the second target data does not need to be retried, step 547 is performed, the writing of the second target data to the target data table is terminated. When it is necessary to retry writing of the second target data, step 510 is returned for execution.

Figure 6:
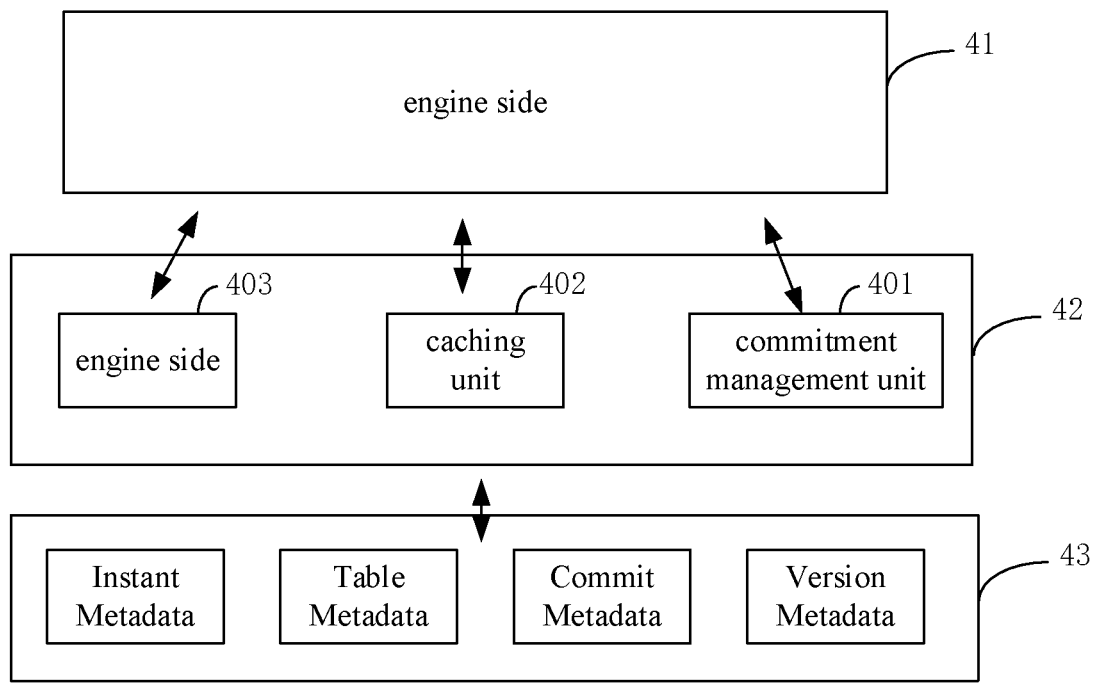
FIG. 6 is a schematic diagram illustrating the interaction logic of a data management method according to an exemplary embodiment.

FIG. 6 is a schematic diagram illustrating the interaction logic of a data management method according to an exemplary embodiment. As shown in FIG. 6, in the metadata storage module 43, the metadata of the data lake, including the Instant Metadata, the Table Metadata, the Commit Metadata and the Version Metadata, are respectively stored in different storage modes. The management service module 42 includes a file splitting unit for splitting data in the target partition, a caching unit 402 for caching metadata in the metadata storage module 43, and a commitment management unit 401 for concurrent write management. When the engine side 41 sends a data access request to the management service module 42, in response to the data access request, if the caching unit 402 has cached data that the engine side 41 needs to access, the management service module 42 reads the corresponding target metadata of the response from the caching unit 402 and returns the corresponding data to the engine side 41 according to the target metadata. If the caching unit 402 does not cache the data that the engine side 41 needs to access, the management service module 42 acquires the corresponding data from the metadata storage module 43 and returns the data to the engine side 41. In addition, for the data returned to the engine side 41, the data acquired by the management service module 42 may be split based on the file splitting unit 403, and the split file is returned to the engine side 41, so as to increase the access speed of the engine side 41.

For the request initiated by the engine side 41 to write the second target data to the target data table of the data lake, the commitment management unit 401 responds to the request to create the Instant Metadata for the corresponding request time point in the metadata storage module 43, and acquire the target version information of the target data table at the request time point, according to the target version information and the latest version information of the target data table, in the case where it is determined that the writing of the second target data does not conflict with the historical writing request for the target data table, the second target data is written into the target data table of the data lake, wherein the historical writing request includes the first commitment request to write data to the data lake and the second commitment request corresponding to each version between the target version information and the latest version information, upon successful writing of the second target data, the Commit Metadata corresponding to the second target data is stored in the metadata storage module 43, and the Table Metadata and the Version Metadata corresponding to the target data table and the Instant Metadata created for the second target data in the metadata storage module 43 are updated.

Figure 7:
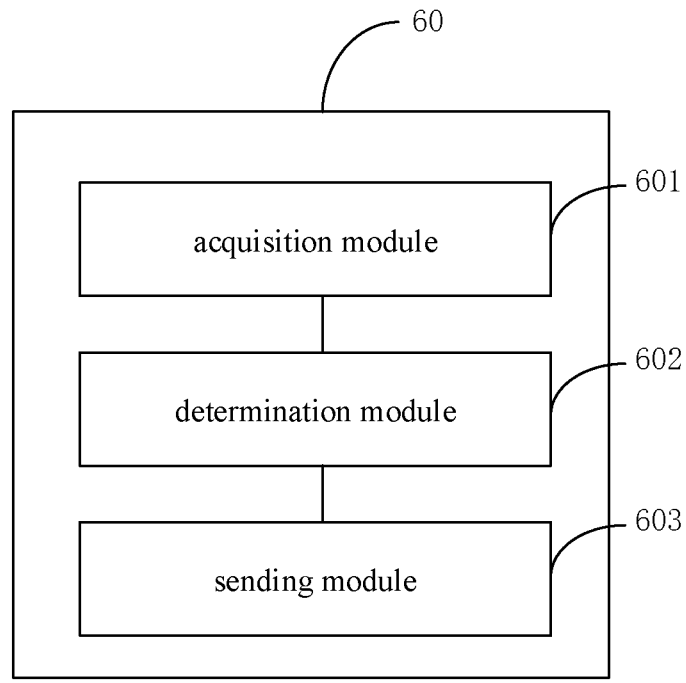
FIG. 7 is a schematic diagram illustrating the connection of modules of a data management apparatus according to an exemplary embodiment.

FIG. 7 is a schematic diagram illustrating the connection of modules of a data management apparatus according to an exemplary embodiment. As shown in FIG. 7, an embodiment of the present disclosure provides a data management apparatus 60, including:

an acquisition module 601, configured to acquire a data access request sent by an engine side, wherein the data access request is for requesting an access operation on first target data in a data lake;

a determination module 602, configured to determine target metadata corresponding to the first target data from a metadata storage module according to the data access request, wherein the metadata storage module stores metadata of the data lake using different storage modes, respectively, and the metadata stored using the different storage modes have at least one kind of same information among the metadata; and a sending module 603, configured to send first target data in the data lake corresponding to the target metadata to the engine side.

In some embodiments, the metadata storage module respectively stores metadata of the data lake by using different storage modes, the metadata comprising Instant Metadata, Table Metadata, Commit Metadata and Version Metadata;

wherein the Instant Metadata is metadata created upon receiving a request for the engine side to write data to the data lake for recording a data writing state;

the Commit Metadata is metadata corresponding to the written data this time submitted after the engine side successfully writes the data once to the data lake;

the Version Metadata characterizes version information of a data table written to the data lake; and the Table Metadata records index information of data in the data table of the data lake.

In some embodiments, the metadata storage module comprises different storage systems, wherein, for each storage system, the metadata of the data lake is stored in a storage mode corresponding to the storage system.

In some embodiments, the Table Metadata comprises data partition information and index information for each data under each partition, and sending the first target data in the data lake corresponding to the target metadata to the engine side comprises:

the sending module 603, configured to dividing data in a target partition according to index information of each data under the target partition comprised in the target metadata to acquire the first target data; and sending the first target data to the engine side.

In some embodiments, the determination module 602, configured to in response to a request to write second target data to a target data table of the data lake, creating Instant Metadata corresponding to a request time point in the metadata storage module, and acquiring target version information of the target data table at the request time point;

according to the target version information and latest version information of the target data table, in a case where it is determined that the writing of the second target data does not conflict with a historical writing request for the target data table, writing the second target data into the target data table of the data lake, wherein the historical writing request comprises a first commitment request to write data to the data lake currently and a second commitment request corresponding to each version between the target version information and the latest version information; and after the writing of the second target data is successful, storing Commit Metadata corresponding to the second target data in the metadata storage module and updating Table Metadata and Version Metadata corresponding to the target data table and Instant Metadata created for the second target data in the metadata storage module.

In some embodiments, the determination module 602, configured to periodically renewing Instant Metadata at the request time point and starting writing of the second target data to the target data table in a case where it is determined that the writing of the second target data does not conflict with both the first commitment request and the second commitment request, according to the target version information and the latest version information; and in the case where the writing of the second target data into the target data table fails, if the writing of the second target data does not conflict with the second commitment request, taking the latest version information as new target version information, and completing the writing of the second target data to the target data table according to the new target version information.

In some embodiments, the determination module 602, configured to determining that the writing of the second target data does not conflict with both the first commitment request and the second commitment request if the writing of the second target data does not conflict with the first commitment request in a case where the target version information is consistent with the latest version information.

In some embodiments, the determination module 602, configured to in a case where the writing of the second target data conflicts with the first commitment request, determining that the writing of the second target data does not conflict with both the first commitment request and the second commitment request if the lease of the first commitment request expires.

In some embodiments, the determination module 602, configured to in a case where the target version information is not consistent with the latest version information, if the writing of the second target data does not conflict with the second commitment request, taking the latest version information as new target version information, and re-determining whether the new target version information is consistent with the latest version information of the target data table according to the new target version information.

In some embodiments, the determination module 602, configured to caching preset types of data stored in the metadata storage module locally to enable the engine side to access data in the data lake based on the preset types of data cached locally.

In some embodiments, the determination module 602, configured to caching a first type of data stored in the metadata storage module locally, wherein the first type of data is data having an access frequency of the engine side reaching a first preset frequency and a data size reaching a first data amount; and/or caching a second type of data stored in the metadata storage module locally based on a least recently used algorithm, wherein the second type of data is data having an access frequency of the engine side reaching a second preset frequency and a data size reaching a second data amount, the second preset frequency is smaller than the first preset frequency, the second data amount is larger than the first data amount.

The specific embodiments of each functional module of the device in the above embodiment have been described in detail in the section on the method, and will not be repeated herein.

Figure 8:
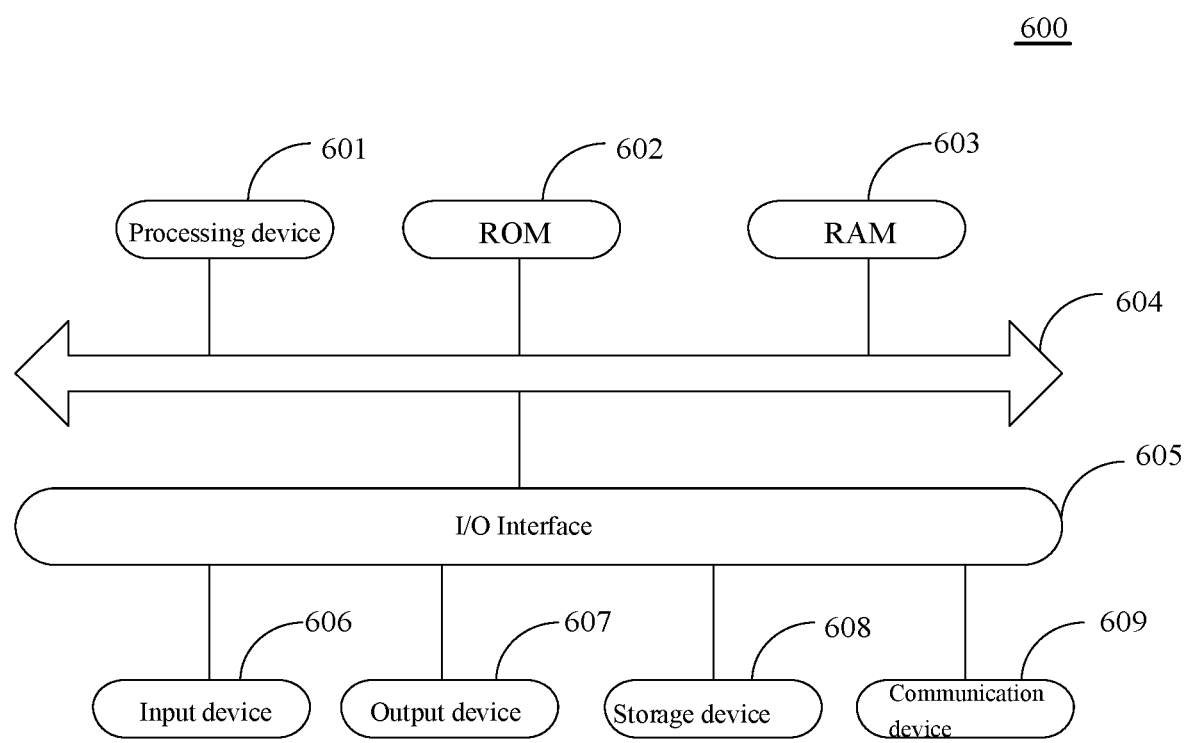
FIG. 8 is a structural diagram of an electronic device according to an exemplary embodiment.

FIG. 8 is a structural diagram of an electronic device according to an exemplary embodiment. As shown in FIG. 8, a schematic diagram of an electronic device suitable for implementing embodiments of the present disclosure is shown. The terminal device in the embodiment of the present disclosure may include, but is not limited to, a mobile terminal such as a mobile phone, a notebook computer, a digital broadcast receiver, a PDA (Personal Digital Assistant), a PAD (Tablet Computer), a PMP (Portable Multimedia Player), an in-vehicle terminal (e.g., an in-vehicle navigation terminal), and the like, and a fixed terminal such as a digital TV, a desktop computer, and the like. The electronic device illustrated in FIG. 8 is merely one example and should not bring any limitation to the functionality and scope of use of embodiments of the disclosure.

As shown in FIG. 8, the electronic device 600 may include a processing apparatus (e.g., a central processor, a graphics processor, etc.) 601 that may execute various appropriate actions and processes in accordance with a program stored in a read only memory (ROM) 602 or a program loaded into a random access memory (RAM) 603 from a storage apparatus 608. In the RAM 603, various programs and data necessary for the operation of the electronic device 600 are also stored. The processing apparatus 601, the ROM 602 and the RAM 603 are connected to each other by a bus 604. An input/output (I/O) interface 605 is also connected to the bus 604.

In general, the following apparatuses may be connected to the I/O interface 605: an input apparatus 606 including, for example, a touch screen, a touch pad, a keyboard, a mouse, a camera, a microphone, an accelerometer, a gyroscope, etc.; an output apparatus 607 including, for example, a liquid crystal display (LCD), a speaker, a vibrator, or the like; a storage apparatus 608 including, for example, a tape, a hard disk, etc.; and a communication apparatus 609. The communication apparatus 609 may allow the electronic device 600 to communicate wirelessly or wired with other devices to exchange data. While FIG. 8 illustrates an electronic device 600 having various apparatuses, it should be understood that not all of the illustrated apparatuses need be implemented or provided. More or fewer apparatuses may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer-readable medium, the computer program containing program codes for performing the methods illustrated by the flowcharts. In such embodiments, the computer program may be downloaded and installed from the network via the communication apparatus 609, or installed from the storage apparatus 608, or installed from the ROM 602. When the computer program is executed by the processing apparatus 601, the above-described functions defined in the methods of the embodiments of the present disclosure are performed.

It should be noted that the computer-readable medium described in the present disclosure may be a computer-readable signal medium or a computer-readable storage medium, or any combination of the two. Computer-readable storage media may be, for example, —but not limited to—electrical, magnetic, optical, electromagnetic, infrared, or semiconductor systems, devices or devices, or any combination thereof. More specific examples of computer-readable storage media may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical memory devices, magnetic memory devices, or any suitable combination of the foregoing. In the present disclosure, the computer-readable storage medium may be any tangible medium comprising or storing a program, which may be used by an instruction execution system, apparatus or device or used in combination therewith. In the present disclosure, the computer-readable signal medium may include a baseband or a data signal propagated as part of a carrier, which carries computer-readable program code. This propagated data signal may take many forms, including but not limited to electromagnetic signals, optical signals, or any suitable combination of the foregoing. The computer-readable signal medium may also be any computer-readable medium other than the computer-readable storage medium, the computer-readable signal medium may send, propagate, or transmit programs used by or used in combination with the instruction execution system, device or device. Program code contained on computer-readable media may be transmitted on any appropriate medium, including but not limited to: wires, optical cables, RF (radio frequency), etc., or any suitable combination thereof.

In some embodiments, the server can communicate using any currently known or future developed network protocol such as HTTP (HyperText Transfer Protocol), and may be interconnected with digital data communication in any form or medium (e.g., communication network). Examples of communication networks include local area networks ("LANs"), wide area networks ("WANs"), the Internet (e.g., the Internet), and end-to-end networks (e.g., ad hoc end-to-end networks), as well as any networks currently known or developed in the future.

The above computer-readable medium may be contained in the electronic device described above; It may also exist alone and not be incorporated into the electronic device.

The above computer-readable medium carries one or more programs, when one or more of the above programs are executed by the electronic device, such that the electronic device: obtain a data access request sent by the engine side, wherein the data access request is used to request access to the first target data in the data lake; According to the data access request, determine the target metadata corresponding to the first target data from the metadata storage module, wherein the metadata storage module uses different storage modes to store the metadata of the data lake separately, and the metadata stored in different storage modes has at least one identical information; The first target data corresponding to the target metadata in the data lake is sent to the engine side.

Computer program code may be written in one or more programming languages or combinations thereof to perform the operations disclosed herein, including, but not limited to, object-oriented programming languages—such as Java, Smalltalk, C++, and also includes general procedural programming languages—such as "C" language or similar programming languages. Program code may be executed entirely on the user's computer, partially on the user's computer, as a stand-alone software package, partly on the user's computer, partially on a remote computer, or completely on a remote computer or server. In the case of a remote computer, the remote computer may be connected to the user's computer through any type of network, including a local area network (LAN) or wide area network (WAN), or may connect to an external computer (e.g., using an Internet service provider to connect via the Internet).

The flowchart and block diagram in the accompanying drawings illustrating the architecture, functions and operations of the systems, methods and computer program products that may be implemented in accordance with various embodiments of the present disclosure. At this point, each box in the flowchart or block diagram may represent a module, a segment, or a portion of code, the module, segment, or part of code contains one or more executable instructions for implementing a specified logical function. It should also be noted that in some alternative implementations, the functions indicated in the box may also occur in a different order than those indicated in the drawings. For example, two boxes represented consecutively can actually be executed in substantially parallel, and they can sometimes be executed in reverse order, depending on the functionality involved. It should also be noted that each box in the block diagram and/or flowchart, and the combination of boxes in the block diagram and/or flowchart, may be implemented by a dedicated hardware-based system performing a specified function or operation, or may be implemented by a combination of dedicated hardware and computer instructions.

The modules described in the present disclosed embodiments may be implemented by software or hardware. Here, the name of a module does not in some cases qualify the module itself.

The functions described above in this article may be performed at least in part by one or more hardware logical components. For example, without limitation, the demonstrated type of hardware logic components that can be used include: field programmable gate arrays (FPGAs), application-specific integrated circuits (ASICs), application-specific standard products (ASSPs), system-on-chips (SOCs), complex programmable logic devices (CPLDs), and the like.

In the context of the present disclosure, the machine-readable medium may be a tangible medium which may comprise or store a program for use by or in combination with the instruction execution system, apparatus or device. Machine-readable media can be machine-readable signal media or machine-readable storage media. Machine-readable media may include, but are not limited to, electronic, magnetic, optical, electromagnetic, infrared, or semiconductor systems, devices or devices, or any suitable combination thereof. More specific examples of machine-readable storage media would include electrical connections based on one or more wires, laptop disks, hard disks, random access memory (RAM), read-only memory (ROM), erasable programmable read-only memory (EPROM or flash memory), optical optics, compact disk read-only memory (CD-ROM), optical storage devices, magnetic storage devices, or any suitable combination of the above.

The above description is only a better embodiment of the present disclosure and a description of the technical principles used. Those skilled in the art should understand that the scope of disclosure involved in the present disclosure is not limited to a particular combination of the above technical features, but should also cover other technical solutions formed by any combination of the above technical features or their equivalents without departing from the above disclosure ideas. For example, the above features and the technical features disclosed in the present disclosure (but not limited to) technical features with similar functions are substituted to form a technical solution.

In addition, although operations are depicted in a particular order, this should not be understood as requiring them to be performed in the specific order indicated or in sequential order. In certain circumstances, multitasking and parallel processing can be advantageous. Similarly, although a number of specific implementation details are included in the foregoing, these should not be interpreted as limiting the scope of the present disclosure. Certain features described in the context of a separate embodiment may also be combined to be implemented in a single embodiment. Conversely, the various features described in the context of a single embodiment may also be implemented individually or in any suitable subcombination in a plurality of embodiments.

Although the subject matter has been described in language specific to structural features and/or method logical actions, it should be understood that the subject matter defined in the appended claims is not necessarily limited to the specific features or actions described above. On the contrary, the specific features and actions described above are only exemplary forms of realization of the claims. With respect to the device in the above embodiment, wherein the specific manner in which each module performs operations has been described in detail in the embodiment of the relevant method, which will not be described in detail herein.

What is claimed is:

1. A data management method, comprising:
   acquiring a data access request sent by an engine side, wherein the data access request is for requesting an access operation on first target data in a data lake;
   determining target metadata corresponding to the first target data from a metadata storage module according to the data access request, wherein the metadata storage module stores metadata of the data lake using different storage modes, respectively, and the metadata stored using the different storage modes have at least one kind of same information among the metadata;
   sending first target data in the data lake corresponding to the target metadata to the engine side;
   wherein the data management method further comprises:
   in response to a request to write second target data to a target data table of the data lake, acquiring target version information of the target data table at the request time point;
   determining whether writing of the second target data conflicts with a historical writing request for the target data table based on the target version information and latest version information of the target data table, wherein the historical writing request comprises a first commitment request to write data to the data lake currently and a second commitment request corresponding to each version between the target version information and the latest version information;
   in response to determining that the writing of the second target data does not conflict with the first commitment request when the target version information is consistent with the latest version information, determining that the writing of the second target data does not conflict with both the first commitment request and the second commitment request;
   in response to determining that the writing of the second target data does not conflict with the second commitment request when the target version information is not consistent with the latest version information, taking the latest version information as new target version information, and re-determining whether the new target version information is consistent with the latest version information of the target data table according to the new target version information; and
   in response to determining that the writing of the second target data conflicts with the first commitment request, determining that the writing of the second target data does not conflict with both the first commitment request and the second commitment request based on determining that a lease of the first commitment request expires.

2. The method according to claim 1, wherein the metadata storage module respectively stores metadata of the data lake by using different storage modes, the metadata comprising Instant Metadata, Table Metadata, Commit Metadata and Version Metadata;
   wherein the Instant Metadata is metadata created upon receiving a request for the engine side to write data to the data lake for recording a data writing state;
   the Commit Metadata is metadata corresponding to the written data this time submitted after the engine side successfully writes the data once to the data lake;
   the Version Metadata characterizes version information of a data table written to the data lake; and
   the Table Metadata records index information of data in the data table of the data lake.

3. The method according to claim 2, wherein the Table Metadata comprises data partition information and index information for each data under each partition, and sending the first target data in the data lake corresponding to the target metadata to the engine side comprises:
   dividing data in a target partition according to index information of each data under the target partition comprised in the target metadata to acquire the first target data; and
   sending the first target data to the engine side.

4. The method according to claim 2, further comprising:
   in response to the request to write the second target data to the target data table of the data lake, creating Instant Metadata corresponding to a request time point in the metadata storage module;
   in response to determining that the writing of the second target data does not conflict with the historical writing request for the target data table, writing the second target data into the target data table of the data lake; and
   after the writing of the second target data is successful, storing Commit Metadata corresponding to the second target data in the metadata storage module and updating Table Metadata and Version Metadata corresponding to the target data table and Instant Metadata created for the second target data in the metadata storage module.

5. The method according to claim 4, wherein the in response to determining that the writing of the second target data does not conflict with the historical writing request for the target data table, writing the second target data into the target data table of the data lake comprises:
   periodically renewing Instant Metadata at the request time point and starting writing of the second target data to the target data table in response to determining that the writing of the second target data does not conflict with both the first commitment request and the second commitment request, according to the target version information and the latest version information; and
   in response to determining that the writing of the second target data into the target data table fails and that the writing of the second target data does not conflict with the second commitment request, taking the latest version information as new target version information, and completing the writing of the second target data to the target data table according to the new target version information.

6. The method according to claim 1, wherein the metadata storage module comprises different storage systems, wherein, for each storage system, the metadata of the data lake is stored in a storage mode corresponding to the storage system.

7. The method according to claim 1, further comprising:
caching preset types of data stored in the metadata storage module locally to enable the engine side to access data in the data lake based on the preset types of data cached locally.

8. The method according to claim 7, wherein caching the preset types of data stored in the metadata storage module locally comprises:
caching a first type of data stored in the metadata storage module locally, wherein the first type of data is data having an access frequency of the engine side reaching a first preset frequency and a data size reaching a first data amount; and/or
caching a second type of data stored in the metadata storage module locally based on a least recently used algorithm, wherein the second type of data is data having an access frequency of the engine side reaching a second preset frequency and a data size reaching a second data amount, the second preset frequency is smaller than the first preset frequency, the second data amount is larger than the first data amount.

9. A non-transitory computer-readable medium having stored thereon a computer program, wherein the computer program, when executed by a processor, cause the processor to implement operations comprising:
acquiring a data access request sent by an engine side, wherein the data access request is for requesting an access operation on first target data in a data lake;
determining target metadata corresponding to the first target data from a metadata storage module according to the data access request, wherein the metadata storage module stores metadata of the data lake using different storage modes, respectively, and the metadata stored using the different storage modes have at least one kind of same information among the metadata;
sending first target data in the data lake corresponding to the target metadata to the engine side;
wherein the operations further comprise:
in response to a request to write second target data to a target data table of the data lake, acquiring target version information of the target data table at the request time point;
determining whether writing of the second target data conflicts with a historical writing request for the target data table based on the target version information and latest version information of the target data table, wherein the historical writing request comprises a first commitment request to write data to the data lake currently and a second commitment request corresponding to each version between the target version information and the latest version information;
in response to determining that the writing of the second target data does not conflict with the first commitment request when the target version information is consistent with the latest version information, determining that the writing of the second target data does not conflict with both the first commitment request and the second commitment request;
in response to determining that the writing of the second target data does not conflict with the second commitment request when the target version information is not consistent with the latest version information, taking the latest version information as new target version information, and re-determining whether the new target version information is consistent with the latest version information of the target data table according to the new target version information; and
in response to determining that the writing of the second target data conflicts with the first commitment request, determining that the writing of the second target data does not conflict with both the first commitment request and the second commitment request based on determining that a lease of the first commitment request expires.

10. The non-transitory computer-readable medium according to claim 9, wherein the metadata storage module respectively stores metadata of the data lake by using different storage modes, the metadata comprising Instant Metadata, Table Metadata, Commit Metadata and Version Metadata;
wherein the Instant Metadata is metadata created upon receiving a request for the engine side to write data to the data lake for recording a data writing state;
the Commit Metadata is metadata corresponding to the written data this time submitted after the engine side successfully writes the data once to the data lake;
the Version Metadata characterizes version information of a data table written to the data lake; and
the Table Metadata records index information of data in the data table of the data lake.

11. The non-transitory computer-readable medium according to claim 10, the operations further comprising:
in response to the request to write the second target data to the target data table of the data lake, creating Instant Metadata corresponding to a request time point in the metadata storage module;
in response to determining that the writing of the second target data does not conflict with the historical writing request for the target data table, writing the second target data into the target data table of the data lake; and
after the writing of the second target data is successful, storing Commit Metadata corresponding to the second target data in the metadata storage module and updating Table Metadata and Version Metadata corresponding to the target data table and Instant Metadata created for the second target data in the metadata storage module.

12. The non-transitory computer-readable medium according to claim 11, wherein the in response to determining that the writing of the second target data does not conflict with the historical writing request for the target data table, writing the second target data into the target data table of the data lake comprises:
periodically renewing Instant Metadata at the request time point and starting writing of the second target data to the target data table in response to determining that the writing of the second target data does not conflict with both the first commitment request and the second commitment request, according to the target version information and the latest version information; and
in response to determining that the writing of the second target data into the target data table fails and that the writing of the second target data does not conflict with the second commitment request, taking the latest version information as new target version information, and completing the writing of the second target data to the target data table according to the new target version information.

13. The non-transitory computer-readable medium according to claim 9, wherein the metadata storage module comprises different storage systems, wherein, for each storage system, the metadata of the data lake is stored in a storage mode corresponding to the storage system.

14. The non-transitory computer-readable medium according to claim 10, wherein the Table Metadata comprises data partition information and index information for each data under each partition, and the sending the first target data in the data lake corresponding to the target metadata to the engine side comprises:
dividing data in a target partition according to index information of each data under the target partition comprised in the target metadata to acquire the first target data; and
sending the first target data to the engine side.

15. An electronic device, comprising:
a storage apparatus having a computer program stored thereon; and
a processing apparatus, configured to execute the computer program in the storage apparatus to implement operations comprising:
acquiring a data access request sent by an engine side, wherein the data access request is for requesting an access operation on first target data in a data lake;
determining target metadata corresponding to the first target data from a metadata storage module according to the data access request, wherein the metadata storage module stores metadata of the data lake using different storage modes, respectively, and the metadata stored using the different storage modes have at least one kind of same information among the metadata;
sending first target data in the data lake corresponding to the target metadata to the engine side;
wherein the operations further comprise:
in response to a request to write second target data to a target data table of the data lake, acquiring target version information of the target data table at the request time point;
determining whether writing of the second target data conflicts with a historical writing request for the target data table based on the target version information and latest version information of the target data table, wherein the historical writing request comprises a first commitment request to write data to the data lake currently and a second commitment request corresponding to each version between the target version information and the latest version information;
in response to determining that the writing of the second target data does not conflict with the first commitment request when the target version information is consistent with the latest version information, determining that the writing of the second target data does not conflict with both the first commitment request and the second commitment request; and
in response to determining that the writing of the second target data does not conflict with the second commitment request when the target version information is not consistent with the latest version information, taking the latest version information as new target version information, and re-determining whether the new target version information is consistent with the latest version information of the target data table according to the new target version information; and
in response to determining that the writing of the second target data conflicts with the first commitment request, determining that the writing of the second target data does not conflict with both the first commitment request and the second commitment request based on determining that a lease of the first commitment request expires.

16. The electronic device according to claim 15, wherein the metadata storage module respectively stores metadata of the data lake by using different storage modes, the metadata comprising Instant Metadata, Table Metadata, Commit Metadata and Version Metadata;
wherein the Instant Metadata is metadata created upon receiving a request for the engine side to write data to the data lake for recording a data writing state;
the Commit Metadata is metadata corresponding to the written data this time submitted after the engine side successfully writes the data once to the data lake;
the Version Metadata characterizes version information of a data table written to the data lake; and
the Table Metadata records index information of data in the data table of the data lake.

17. The electronic device according to claim 16, the operations further comprise:
in response to the request to write the second target data to the target data table of the data lake, creating Instant Metadata corresponding to a request time point in the metadata storage module;
in response to determining that the writing of the second target data does not conflict with the historical writing request for the target data table, writing the second target data into the target data table of the data lake; and
after the writing of the second target data is successful, storing Commit Metadata corresponding to the second target data in the metadata storage module and updating Table Metadata and Version Metadata corresponding to the target data table and Instant Metadata created for the second target data in the metadata storage module.

18. The electronic device according to claim 17, wherein, according to the target version information and the latest version information of the target data table, in the case where it is determined that the writing of the second target data does not conflict with the historical writing request for the target data table, writing the second target data into the target data table of the data lake comprises:
periodically renewing Instant Metadata at the request time point and starting writing of the second target data to the target data table in response to determining that the writing of the second target data does not conflict with both the first commitment request and the second commitment request, according to the target version information and the latest version information; and
in response to determining that the writing of the second target data into the target data table fails and that the writing of the second target data does not conflict with the second commitment request, taking the latest version information as new target version information, and completing the writing of the second target data to the target data table according to the new target version information.

19. The electronic device according to claim 15, wherein the metadata storage module comprises different storage systems, wherein, for each storage system, the metadata of the data lake is stored in a storage mode corresponding to the storage system.

20. The electronic device according to claim 16, wherein the Table Metadata comprises data partition information and index information for each data under each partition, and sending the first target data in the data lake corresponding to the target metadata to the engine side comprises:

dividing data in a target partition according to index information of each data under the target partition comprised in the target metadata to acquire the first target data; and sending the first target data to the engine side.

\* \* \* \* \*